United States Patent [19]

Miura et al.

[11] 4,422,086

[45] Dec. 20, 1983

[54] DEVICE FOR FEEDING CONSTANT PRESSURE FLUID

[75] Inventors: Masayoshi Miura, Kawasaki; Gen Oda, Sagamihara; Kenji Akami, Kawasaki; Hiroshi Naito, Machida, all of Japan

[73] Assignee: Matsushita Electric Industrial Company, Limited, Osaka, Japan

[21] Appl. No.: 340,811

[22] Filed: Jan. 19, 1982

[30] Foreign Application Priority Data

Jan. 20, 1981 [JP] Japan ................................. 56-7724

[51] Int. Cl.³ ........................................... G01D 15/16
[52] U.S. Cl. ............................................... 346/140 R
[58] Field of Search ............................ 346/1.1, 75, 140

[56] References Cited

U.S. PATENT DOCUMENTS 2,176,777 10/1939 Tate ................................ 346/140 R
2,214,636 9/1940 Hutchens ........................ 346/140 X
4,188,634 2/1980 Anderka et al. ............ 346/140 R X

FOREIGN PATENT DOCUMENTS 54-10449 5/1979 Japan .

Primary Examiner—Donald A. Griffin
Attorney, Agent, or Firm—Lowe, King, Price & Becker

[57] ABSTRACT

In a nonimpact printer a device is provided for feeding a constant pressure fluid to a nonimpact printing head reciprocally movable to scan across a recording sheet. The feeding device is formed with a pair of identical first and second chambers connected respectively to first and second sections of a conduit through which the fluid is supplied from a source to the device. Fluid communication is established between the first and second chambers by a connecting channel which is smaller in cross section than the cross section of the first and second chambers and is connected to the printing head through a narrow passageway.

22 Claims, 9 Drawing Figures

DEVICE FOR FEEDING CONSTANT PRESSURE FLUID

BACKGROUND OF THE INVENTION

The present invention relates generally to nonimpact printers, and in particular to a device for feeding constant pressure fluid to a nonimpact printing head which is arranged to scan across a writing surface.

In nonimpact printers where an ink jet printing head is reciprocally moved at high speeds to scan across a recording sheet, a pressure variation tends to occur when the head is making a turn at each end of a scanned line path due to the momentum of the liquid in a flexible conduit that is connected to the head for movement therewith.

A nonimpact printer shown and described in Japanese Pat. No. 54-10449 comprises a loop of flexible conduit which is divided into first and second half sections at a first node connected to an ink source and at a second node connected to a reciprocally movable ink jet printing head. The ink is supplied through the first and second half sections of the flexible conduit to the printer. Since the pressure variation that occurs in each of the half sections is opposite to the pressure variation that occurs in the other half section, such pressure variations could be cancelled out from each other.

However, due to the flow resistance which still exists in the inner wall of the supply conduit and in its curved path, the flow movement in the conduit tends to be converted into pressure variations. The problem becomes apparent when a quick response ink jet printing head as that disclosed in U.S. Pat. No. 3,747,120 is employed. Specifically, the pressure variation which might occur in such printing heads needs to be held below 0.033 kilograms/centimeter square for satisfactory operation. The prior art printer thus fails to meet this requirement and thus improvement has been desired.

SUMMARY OF THE INVENTION

An object of the present invention is to provide a device for feeding a fluid under substantially constant pressure to a utilization element such as ink jet printing head, wherein the fluid is supplied to the feeding device through a conduit from a fluid source.

According to a first aspect of the invention, the feeding device comprises a pair of first and second identical chambers respectively connected to first and second sections of the conduit, a connecting channel for connecting the first and second chambers, and a passageway through which the connecting channel is in communication with the utilization element, wherein the transverse cross section of the connecting channel is smaller than the transverse cross section of the first and second chambers.

Preferably, the transverse cross section of the connecting channel is equal to or smaller than ⅓ of the transverse cross section of the first and second chambers.

According to a second aspect of the invention, an arrangement for use in a nonimpact printer is provided which comprises a reciprocally movable nonimpact printer head for ejecting fluid to a writing surface in response to an electrical signal applied thereto, a flexible conduit having first and second sections one of which is connected to a source of fluid, and a device movable with the printing head and formed with a pair of first and second identical fluid chambers respectively connected to the first and second sections of the conduit, a connecting channel for connecting the first and second chambers fluidic communication therebetween, the transverse cross section of the connecting channel being smaller than the transverse cross section of the first and second chambers, and a passageway through which the fluid in the connecting channel is supplied to the printing head.

BRIEF DESCRIPTION OF THE DRAWINGS

The invention will be described in further detail with reference to the accompanying drawings, in which:

FIG. 2 is a schematic illustration of a modified form of the arrangement of FIG. 1a;

DETAILED DESCRIPTION

Figure 1A:
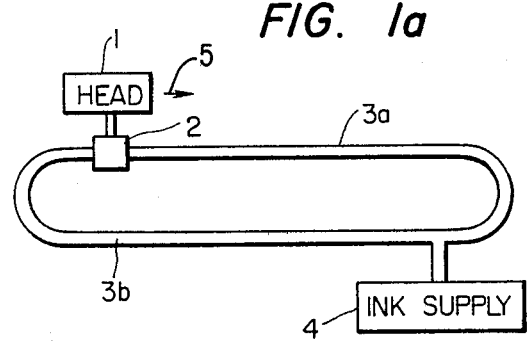
FIGS. 1a to 1c are schematic illustrations of a nonimpact printing head arrangement operating in different working positions.
Figure 1B:
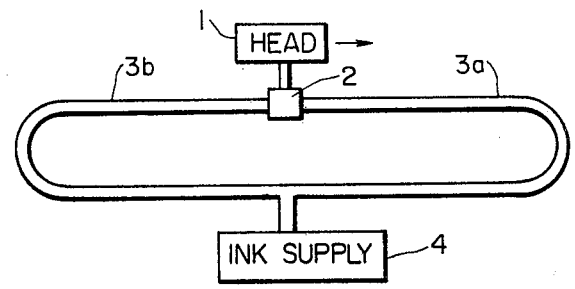
Figure 1C:
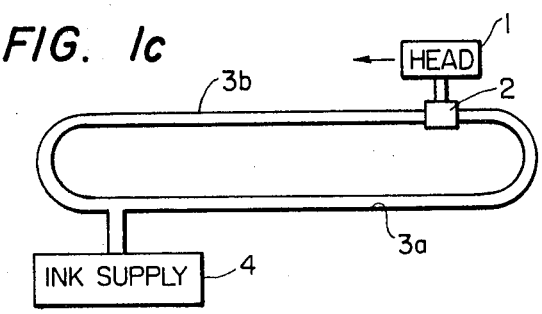

Referring now to FIGS. 1a to 1c, a nonimpact printer embodying the present invention is illustrated schematically in different working positions. The printer comprises an ink ejecting head 1, a pressure variation absorber 2 and a pair of flexible tubes or conduits 3a, 3b forming a loop through which ink is fed from a source 4 to the pressure variation absorber 2 and thence to the head 1. The most preferred type of the printer head 1 is shown and described in U.S. Pat. No. 3,747,120 which is responsive to an electrical signal to eject ink in the form of a jet to a writing surface. The printer head 1 and absorber 2 are mounted on a common carrier, not shown, which is movable on a guide shaft in opposite directions with respect to the ink source 4 so that the head 1 is scanned across a recording sheet which is successively driven in a direction normal to the direction of movement of the head by the width of a scanned line path.

In FIG. 1a, the printer head 1 is shown in a line-start position from which it moves to the right as indicated by arrow 5. The conduits 3a, 3b are flexible enough to move with the printer head so that the loop is maintained always regardless of the position of the printer head. The printer head moves past a midpoint (FIG. 1b) and continues on to a line-end position (FIG.1c) and then moves backward to the line-start position.

Figure 2:
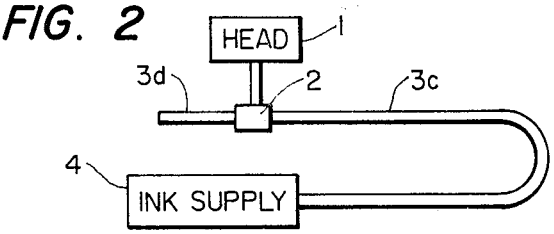

As the printer head makes a turn at the line-start position, a transitory pressure increase occurs in the liquid in the conduits under its own momentum so that it creates a transitory liquid flow in the leftward direction. Subsequent turning of the printer head at the line-end position then produces a transitory rightward ink flow. Such transitory ink flows would create undesirable variations in liquid pressure on the printer head so that it produces an undesirable image at each end of a scanned line path. The pressure variation absorber 2 is a device intended to feed ink under substantially constant pressure to the printer head by effectively absorbing such transitory pressure variations. The absorber 2 can also be used in a printer shown in FIG. 2 in which a supply conduit 3c and a closed-ended flexible conduit 3d are employed instead of the paired conduits 3a, 3b of FIG. 1a. In this type of printer conduit 3d is more flexible than conduit 3c so that it expands and contracts in response to the transitory ink flows that move in opposite directions.

Figure 3:
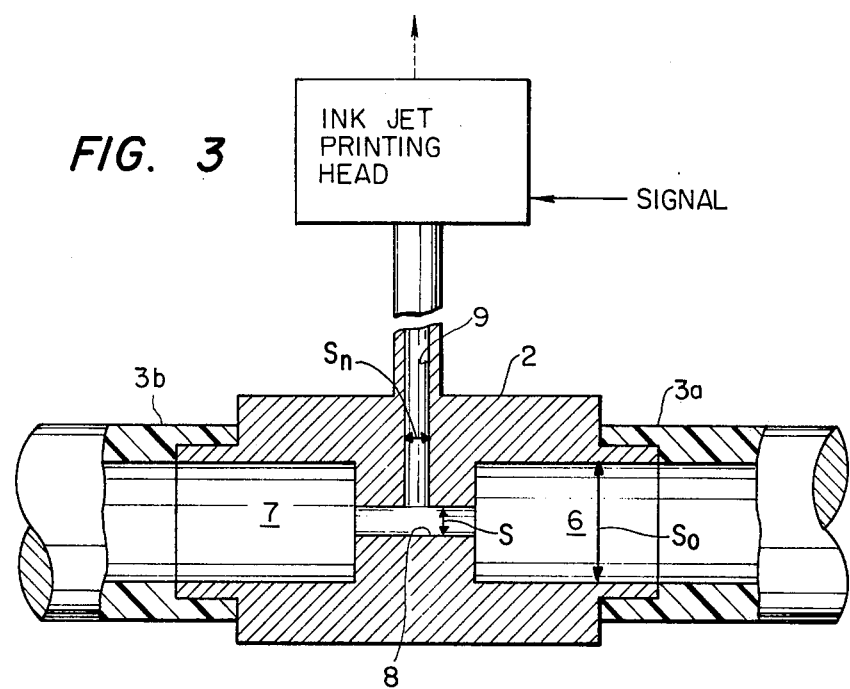
FIG. 3 is an illustration of the detail of the device for feeding constant pressure fluid according to the invention.

Referring to FIG. 3 details of the pressure variation absorber 2 are illustrated. The absorber 2 comprises a pair of cylindrical left and right fluid chambers 6 and 7 having the same cross section as the inner cross section of ink supply conduits 3a, 3b with which they are connected. Fluid communication between chambers 6 and 7 is established by a connecting channel 8 having an equal transverse cross section S throughout its axial length. The cross section S of the channel 8 is smaller than the transverse cross section So of the chambers 6 and 7. An ink feeding passageway 9 extends perpendicularly from an intermediate point of the connecting channel 8 to the printer head 1.

When the printer head makes a turn at the line-start position, the liquid pressure in the left chamber 6 increases rapidly due to the momentum of liquid in conduit 3a that moves with the head. This in turn creates a rapid pressure drop in the left chamber 7 due to the momentum of the liquid in conduit 3b tending to move in a direction away from the chamber 7. The pressure relation between chambers 6 and 7 is reversed when the printer head makes a turn at the line-end position.

At each turn of the printer head, liquid pressures Pa and Pb in the right and left chambers 6 and 7 are respectively given by the following Equation:

$$Pa + (\tfrac{1}{2})(\rho Vo^2) = Ph + (\tfrac{1}{2})\rho Vo^2 + (\tfrac{1}{2})kV \quad (1)$$
$$= Pb + (\tfrac{1}{2})\rho Vo^2 + kV$$

where,
$\rho$ = the density of ink
Vo = the velocity of ink in chambers 6 and 7
V = the velocity of ink in connecting channel 8
k = the coefficient of flow resistance to ink in connecting channel 8, and
Ph = the pressure at the midpoint of connecting channel 8.

From Equation (1), the pressure Ph in the connecting channel 8 is expressed by $$Ph = (\tfrac{1}{2})(Pa + Pb) + \rho(\tfrac{1}{2})(Vo^2 - V^2) \quad (2)$$

Since the volume of ink flow is uniform at all points of the system, Equation (2) can be rewritten as follows:

$$V = (So/S)Vo = cV_o \quad (3)$$

From Equations (2) and (3), the following Equation holds:

$$Ph = (\tfrac{1}{2})(Pa + Pb) + (\tfrac{1}{2})\rho(1 - c^2)Vo^2 \quad (4)$$

It is seen from Equation (4) that by appropriately dimensioning the cross sections So and S, the pressure Ph in the ink feeding channel 9 can be reduced substantially to zero so that the ink supplied to the printer head is substantially kept at a constant pressure. Experiments show that with the ratio value "c" being equal to or greater than 3, the pressure variation in the feeding channel 9 is significantly reduced.

It is also found that the cross section Sh of the ink feeding channel 9 is preferably equal to or smaller than twice the cross section S of the connecting channel 8 to minimize the effect of turbulence in liquid flow which might occur at the intersection of the feeding channel 9 with the connecting channel 8 if the cross section Sh is relatively large in proportion to the cross section S.

Tests were conducted on the absorber 2 of FIG. 3 with the conduits 3a, 3b having an inner diameter of 1 mm, the connecting channel 8 being 0.4 mm in diameter and the feeding channel 9 being 0.2 mm (i.e., c=6.25 and Sh/S=¼). It was shown that the printer head 1 is capable of moving at a speed of about 1.5 meters per second which is five times higher than the speed attainable with the conventional nonimpact printer.

Figure 4:
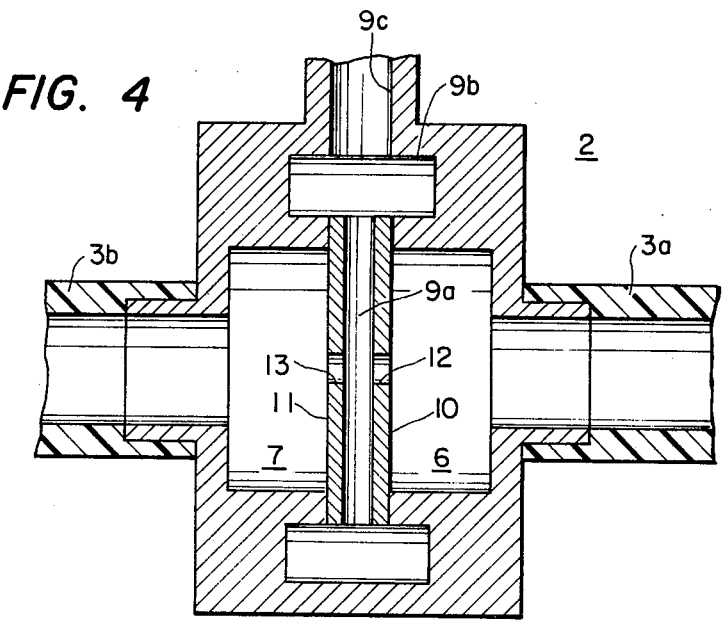
FIGS. 4 to 7 are illustrations of modified forms of the device of FIG. 3.

FIG. 4 is a modified embodiment of the pressure variation absorber 2 in which the parts corresponding to those in FIG. 3 are designated by like numerals. In this modification, the chambers 6 and 7 are separated by a pair of axially spaced apart dividing disks 10 and 11 having axially aligned orifices 12 and 13. The space 9a between the dividing disks 10 and 11 is in communication with an annular chamber 9b which in turn is connected through an ink feeding channel 9c to the printer head 1. It will be noted that the axially aligned orifices 12 and 13 correspond to the connecting channel 8 and the space 9a, annular chamber 9b and feeding channel constitute the ink feeding passageway 9 of the previous embodiment. Being smaller than the axial dimension of the connecting channel 8 of the previous embodiment, the flow resistance value "k" of the orifices 12 and 13 can be rendered small as compared with the previous embodiment. With this arrangement the dimensional relations Sh/S and So/S can be satisfied with a good margin. In this embodiment, the cross section of the chambers 6 and 7 is preferably greater than the cross section of the conduits 3a and 3b for the purpose of absorbing pressure variations. Due to the relatively large volume the annular chamber 14 also contributes to the reduction of such pressure variations. The pressure reduction can be further enhanced by providing one or more additional orifice disks in the space 15 so that the latter is divided into a plurality of ink feeding layers. For manufacturing purposes, one or more spacers could be provided between the disks 10 and 11 to assure uniformity in spacing between them.

Tests were conducted on the absorber 2 of FIG. 4 with the orifices 12, 13 being 0.2 mm in diameter and the space 15 being 0.08 mm apart. It was shown that the printer head 1 is capable of moving at a speed of about 2.5 meters per second.

Figure 5:
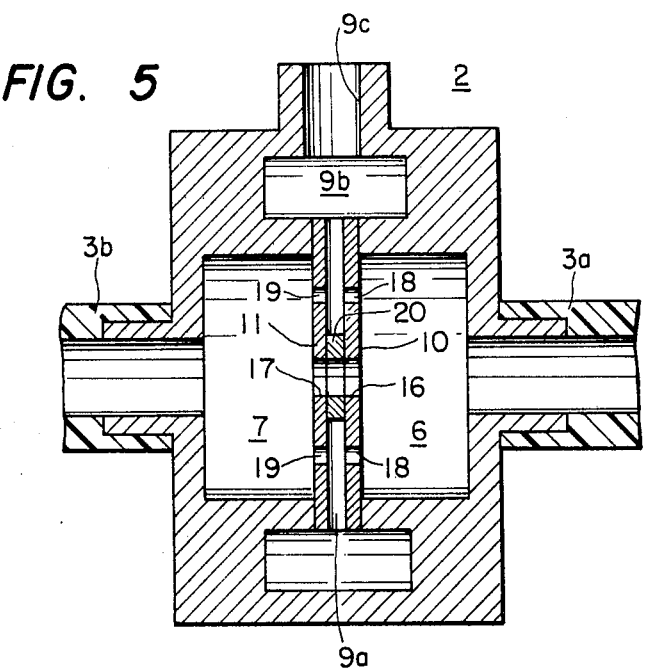

A further modification of the pressure variation absorber 2 is illustrated in FIG. 5 in which similar parts to those in FIG. 4 are designated by like numerals. The embodiment of FIG. 5 is generally similar to the FIG. 4 embodiment with the exception that the dividing disks 10 and 11 are provided with axially aligned center orifices 16 and 17 and a plurality of angularly spaced apart, axially aligned orifices 18 and 19. The dividing disks 10 and 11 are spaced apart by a ring spacer 20 with its opening aligned with the center orifices 16, 17. The center orifices 16, 17 are dimensioned so that they act as a main passageway for the liquid in each of the chambers 6 and 7 to flow into the other chamber for purposes of absorbing pressure variations, while the other orifices are dimensioned so that they chiefly act as passageways for the liquid in each of left and right chambers to admit into annular chamber 9b. This embodiment allows ease with which the optimum cross section of the center orifices 16, 17 can be selected with a good margin.

In a practical embodiment the diameter of center orifices 16, 17 is 1/15 to ½ of the inner diameter of the supply conduits 3a, 3b depending on the axial dimension of the space 9a and the thickness of the orifice disks 10, 11 and the number of orifices 18, 19. The diameter of the other orifices 18, 19 ranges from 1/15 to ½ of the inner diameter of the feeding channel 9. The disks 10 and 11 are preferably spaced a distance of 500 micrometers or less.

Figure 6:
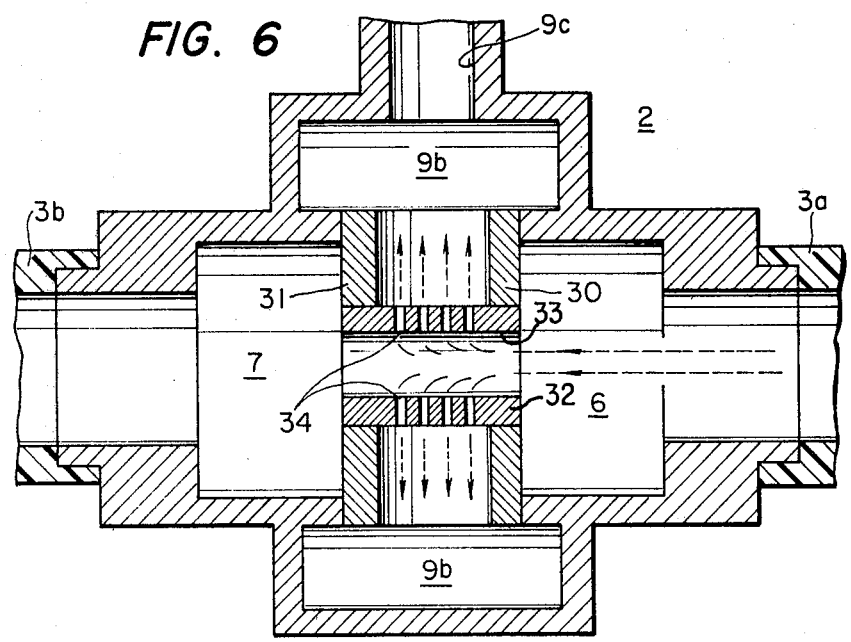

The pressure absorbing effect can be further enhanced by increasing the viscous resistance of ink flow. An embodiment shown in FIG. 6 includes a pair of dividing disks 30 and 31 each having aligned openings in which is provided a cylinder 32 having an axially extending throughbore 33 connecting the chambers 6 and 7 and a plurality of radially extending narrow passageways 34 which connect the chambers 6, 7 with the annular chamber 9b. The radially extending passageways 34 each have a diameter, preferably 300 micrometers or less. The diameter of this value is sufficient to produce a viscous resistance to liquid flow therein. The thickness of the cylinder 32 preferably ranges from 0.3 mm to 5 mm. Since the viscous resistance increases as a function of the number of passageways 34, it is desirable that the passageways 34 be provided as many as possible for purposes of reducing pressure variations.

Figure 7:
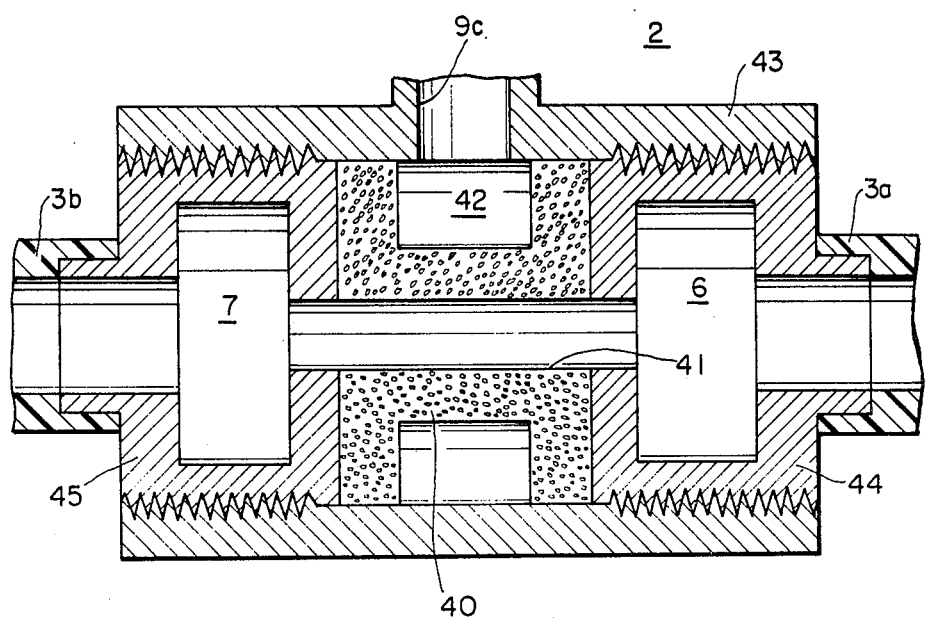

FIG. 7 is a further embodiment of the invention which is preferred for manufaturing purposes. In FIG. 7, the absorber comprises a porous member 40 of a cylindrical construction having a throughbore 41 and an annular groove 42 which corresponds to the annular chamber 14 of the previous embodiments. Suitable materials of the porous member 40 includes sintered metal or intertwined fibers. The porous member 40 is located between the right and left chambers 6 and 7 so that its throughbore 41 serves as a connecting channel between them and the annular groove 42 is in communication with the ink feeding channel 9c. The feeding channel 9c is formed in an outer cylinder 43 which is threadably engaged with a pair of axially arranged inner cylinders 44 and 45 in which the fluid chambers 6 and 7 are formed respectively.

What is claimed is:

1. A device for feeding a fluid under substantially constant pressure to a utilization element having a tendency to be exposed to abrupt variations in fluid pressure, said fluid being supplied to said device through a conduit from a fluid single supply source, comprising:
   first means forming a pair of first and second substantially identical chambers respectively connected to the single supply source in a closed loop circuit through first and second sections of said conduit;
   second means forming a connecting channel connecting said first and second chambers, the cross section of said connecting channel being smaller than the cross section of each of said first and second chambers; and
   third means forming a passageway connected at one end to a point intermediate opposite ends of said connecting channel and at the other end to said utilization element, said device being operable to absorb transitory pressure variations in said conduit sections to enable said second and third means to deliver fluid under substantially constant pressure to said utilization element.

2. A device as claimed in claim 1, wherein said connecting channel has a transverse cross section equal to or smaller than approximately ⅓ of the transverse cross section of said first and second chambers.

3. A device as claimed in claim 1 or 2, wherein said connecting channel has a transverse cross section equal to or greater than approximately ½ of the transverse cross section of said passageway.

4. A device as claimed in claim 1, further comprising an annular chamber through which said passageway is in communication with said utilization element.

5. A device as claimed in claim 1, wherein said first and second chambers are divided by a plurality of first axially spaced apart dividing members, and wherein said connecting channel is formed by a plurality of axially aligned orifices provided in said dividing members and said passageway is formed by the space between said dividing members.

6. A device as claimed in claim 5, further comprising a plurality of second axially aligned orifices provided in said dividing members, and means for isolating the first axially aligned orifices from said space so that said first and second chambers are in communication with said space through said second orifices and in communication with each other through said first orifices.

7. A device as claimed in claim 1, wherein said passageway extends substantially perpendicular to an intermediate point of said connecting channel.

8. A device as claimed in claim 1, wherein said first and second chambers are divided by a pair of axially spaced apart dividing members having axially aligned openings, and a cylinder extending axially between the openings of said dividing members, said cylinder having a throughbore defining said connecting channel and a plurality of radially extending orifices to form said passageway.

9. A device as claimed in claim 1, wherein said first and second chambers are divided by a pair of axially spaced apart dividing members having axially aligned openings and a porous member of a cylindrical construction extending between said aligned openings to form said passageway.

10. A device as claimed in claim 1, wherein said passageway is connected to a midpoint between said opposite ends of the connecting channel.

11. A device as claimed in claim 1, wherein said first, second and third means are provided in a single block.

12. Apparatus for use in a nonimpact printer to control ejection of a fluid onto a writing surface, comprising:
   reciprocally movable nonimpact printing head means for ejecting fluid onto a writing surface in response to an electrical signal applied thereto;
   a flexible conduit having first and second sections, one end of each of the conduit sections being connected to a source of fluid; and
   control means movable with said printing head for delivering fluid under substantially constant pressure to said head during reciprocal movement, said control means including a pair of first and second substantially identical fluid chambers respectively connected to the other end of each said first and second conduit sections, a connecting channel connecting said first and second chambers to provide fluidic communication therebetween, wherein said connecting channel having a cross section smaller than the cross section of each of said first and second chambers, and a passageway connected at one end to said connecting channel at opposite ends thereof and connected at the other end to said printing head.

13. An arrangement as claimed in claim 12, wherein the cross section of said connecting channel is equal to or smaller than ⅓ of the cross section of said first and second chambers.

14. An arrangement as claimed in claim 12 or 13, wherein the cross section of said connecting channel is equal to or greater than ½ of the cross section of said passageway.

15. An arrangement as claimed in claim 12, further comprising an annular chamber through which said passageway is in communication with said printing head.

16. Apparatus as claimed in claim 12, wherein said first and second chambers are divided by a plurality of axially spaced apart dividing members, and wherein said connecting channel is formed by a plurality of axially aligned orifices provided in said dividing members and said passageway is formed by the space between said dividing members.

17. An arrangement as claimed in claim 16, further characterized by a second plurality of axially aligned orifices provided in said dividing members and means for isolating the first mentioned plurality of axially aligned orifices from said space so that said first and second chambers are in communication with said space through said second plurality of orifices and in communication with each other through said first plurality of orifices.

18. An arrangement as claimed in claim 12, wherein said passageway extends perpendicularly from an intermediate point of said connecting channel.

19. An arrangement as claimed in claim 12, wherein said first and second chambers are divided by a pair of axially spaced apart dividing members having axially aligned openings, and a cylinder axially extending between the openings of said dividing members and having a throughbore to form said connecting channel, said cylinder having a plurality of radially extending orifices to form said passageway.

20. An arrangement as claimed in claim 12, wherein said first and second fluid chambers are divided by a pair of axially spaced apart dividing members having axially aligned openings and a porous member of a cylindrical construction extending between said aligned openings to form said passageway.

21. An arrangement as claimed in claim 12, wherein the cross section of said first and second fluid chambers is greater than the inner cross section of said conduit.

22. Apparatus as claimed in claim 12, wherein said passageway is connected to a midpoint between said opposite ends of the connecting channel.

* * * * *